(12) United States Patent
Nugent

(10) Patent No.: US 6,962,318 B1
(45) Date of Patent: Nov. 8, 2005

(54) PULSED INPUT SHUTOFF VALVE

(76) Inventor: William P. Nugent, 460 W. Paddock Cir., Wayzata, MN (US) 55391

(*) Notice: Subject to any disclaimer, the term of this patent is extended or adjusted under 35 U.S.C. 154(b) by 14 days.

(21) Appl. No.: 10/826,423

(22) Filed: Apr. 15, 2004

(51) Int. Cl.⁷ .............................................. F16K 17/00
(52) U.S. Cl. .................. 251/30.05; 251/24; 251/30.02; 137/460
(58) Field of Search ........................ 251/30.01, 30.02, 251/30.05, 24, 25, 324; 137/460

(56) References Cited

U.S. PATENT DOCUMENTS

| | | |
|---|---|---|
| 3,023,591 A | 3/1962 | Tilney |
| 3,980,002 A | 9/1976 | Jarman et al. |
| 4,655,240 A | 4/1987 | Flinchum |
| 4,673,162 A | 6/1987 | Lachmann |
| 5,224,684 A | 7/1993 | Schouten |
| 5,341,839 A * | 8/1994 | Kobayashi et al. .... 137/505.13 |
| 5,417,402 A * | 5/1995 | Speybroeck ............. 251/30.01 |
| 5,503,175 A | 4/1996 | Ravilious et al. |
| 5,535,778 A | 7/1996 | Zakai |
| 5,971,011 A * | 10/1999 | Price ........................... 137/460 |
| 5,979,493 A | 11/1999 | Simpkins, Jr. |
| 5,979,863 A | 11/1999 | Lousberg |
| 6,062,247 A | 5/2000 | King, Sr. |
| 6,105,607 A | 8/2000 | Caise et al. |
| 6,119,720 A * | 9/2000 | Isaacson et al. ............ 137/459 |
| 6,209,576 B1 | 4/2001 | Davis |
| 6,263,905 B1 | 7/2001 | Yokota et al. |
| 6,374,846 B1 | 4/2002 | DeSmet |
| 6,612,536 B2 | 9/2003 | Dalton |
| 6,766,835 B1 | 7/2004 | Fima |

FOREIGN PATENT DOCUMENTS

WO    WO2004026708    4/2004

* cited by examiner

Primary Examiner—J. Casimer Jacyna
(74) Attorney, Agent, or Firm—Gray, Plant, Mooty, Mooty & Bennett, P.A.; Peter Forrest

(57) ABSTRACT

Methods and devices for shutting off flow in fluid lines by an automated remote sensor signal, when leakage is detected, are disclosed. A shutoff valve has an inlet for connection to the upstream end of the pressurized fluid line, an outlet for connection to the downstream end of the pressurized fluid line, and a springless actuator for driving a valve between open and closed positions. A normally closed solenoid valve is connected between the upstream end of the pressurized fluid line and the springless actuator. A two-position fluid reset switch is also connected to the springless actuator. The shutoff valve further comprises a region of reduced pressure downstream of the actuator but prior to the outlet for connection to the downstream end of the pressurized fluid line. The region of reduced pressure is connected through the fluid reset switch to the springless actuator.

25 Claims, 2 Drawing Sheets

PULSED INPUT SHUTOFF VALVE

TECHNICAL FIELD

The invention involves methods and devices for shutting off flow in a fluid line when a leak has been detected.

BACKGROUND

Fluid lines bearing pressurized fluid ("pressure fluid lines") often do not have any type of automatic leak detection system, and only manually actuated shutoff valves are available on the lines should a leak be detected for any reason. For example, in a typical residence, there may be as many as sixteen such lines serving fixtures and appliances such as toilets, sinks, clothes washers, etc. If a line or fitting leaks for any reason, typically the only knowledge of the leak comes from direct human observation of the water or damage caused by the water, as opposed to any form of automatic sensor.

Automatic leak detection systems and electrically controlled shutoff valve systems do exist, but they are typically too expensive for residential housing and similar situations. In many cases, they require that the detection system be electrically powered at all times. This is undesirable, because power outages do occur, and can in fact be the cause of the leakage. For example, a power outage in the late fall or early spring can cause an unoccupied summer residence to cool down so much that a water pipe, yet to be drained for the winter, bursts due to freezing water. Such systems also typically employ a spring-driven normally open valve so that the fixture or appliance downstream of the valve will still operate if the power or other portions of the system fail, but there is obviously no leak present and the fixture must be operated normally anyway. A normally closed valve system would fail closed and shutoff fluid to the appliance even though no leak had been detected.

Another problem faced by such systems is sediment buildup in the valve. Even the most clean of domestic water systems has some sediment level, and especially in rural areas sediment is present in well water. It may be many years before a leak occurs, but the valve must work properly the first time it is activated by the leak detection system.

SUMMARY OF THE INVENTION

The invention involves methods and devices for automatically shutting off flow in a fluid line when leakage is detected. The specific device is a valve assembly comprising the combination of a springless shutoff valve, a normally closed solenoid valve activated by an electric or electronic pulse signal, and a fluid reset switch. Because the shutoff valve does not have a spring, it is not "normally open" or "normally closed" in the usual sense, but instead is driven between open and closed positions depending on the pressures in its inlet (upstream) and outlet (downstream) ends, which are connected to the shutoff valve actuator through the solenoid valve and the integral fluid reset switch, respectively.

The combination of these components is arranged so that the valve is "normally open" to normal fluid flow through the valve, thus allowing fluid to flow from inlet to outlet. From this position, the valve closes when the pulse signal activates the solenoid valve (i.e., a leak was detected and the pulse issued to the solenoid valve). It will subsequently remain closed even if power to the system that generated the pulse signal is lost. The integral fluid reset switch (e.g., a manually activated switch) can shut the valve under normal condition, even if no signal to do so has been received from the leak detection system. Once the shutoff valve is closed, the fluid reset switch must again be used to open the shutoff valve and allow flow to begin again.

In general terms, the invention can be described as a combination for application onto a pressurized fluid line having upstream and downstream ends, comprising: (a) a shutoff valve having an inlet for connection to the upstream end of the pressurized fluid line, an outlet for connection to the downstream end of the pressurized fluid line, and a springless actuator for driving a plug between open and closed positions of a main flow path connecting the upstream and downstream ends through the shutoff valve, and an upper chamber adjacent the springless actuator; (b) a normally closed two-position solenoid valve controlling flow between the upper chamber and an inlet bypass channel connected to the inlet of the shutoff valve; and (c) a fluid reset switch controlling flow between the upper chamber and a outlet bypass channel connected to the outlet of the shutoff valve. A region of reduced pressure is located downstream of the springless actuator but upstream of the downstream end of the pressurized fluid line. The region of reduced pressure is connected to the outlet bypass channel side of the fluid reset switch.

BRIEF DESCRIPTION OF THE DRAWINGS

The accompanying drawings show a particular embodiment of the invention as an example, and are not intended to limit the scope of the invention.

DETAILED DESCRIPTION

Throughout this application, the terms "fluid line" and similar terms include not only such fluid lines themselves, but also associated fittings and the like that would be understood by the person of ordinary skill in the art of piping to be desirable, necessary, or included for any purpose, even if not specifically stated below.

In many situations, pressure fluid lines are subjected to wide variations in ambient conditions that can cause undetected leakage. This is especially the case when the fluid lines are in buildings that are unoccupied and/or unheated in winter months. For example, even relatively small water lines that have not been drained may leak substantial amounts of water if cold temperatures cause the line to burst or crack, and the water flow is not shutoff because the leakage is not quickly detected. If the water lines are in a building such as a summer cabin that is not occupied for months at a time, the damage can be significant even if the rate of leakage is low, because the damage may go undetected for a long time. This is only an example, however, as the scope of the invention is not limited to this particular cause of leakage, or this type of installation or building use, or even to water as the fluid.

Figure 1:
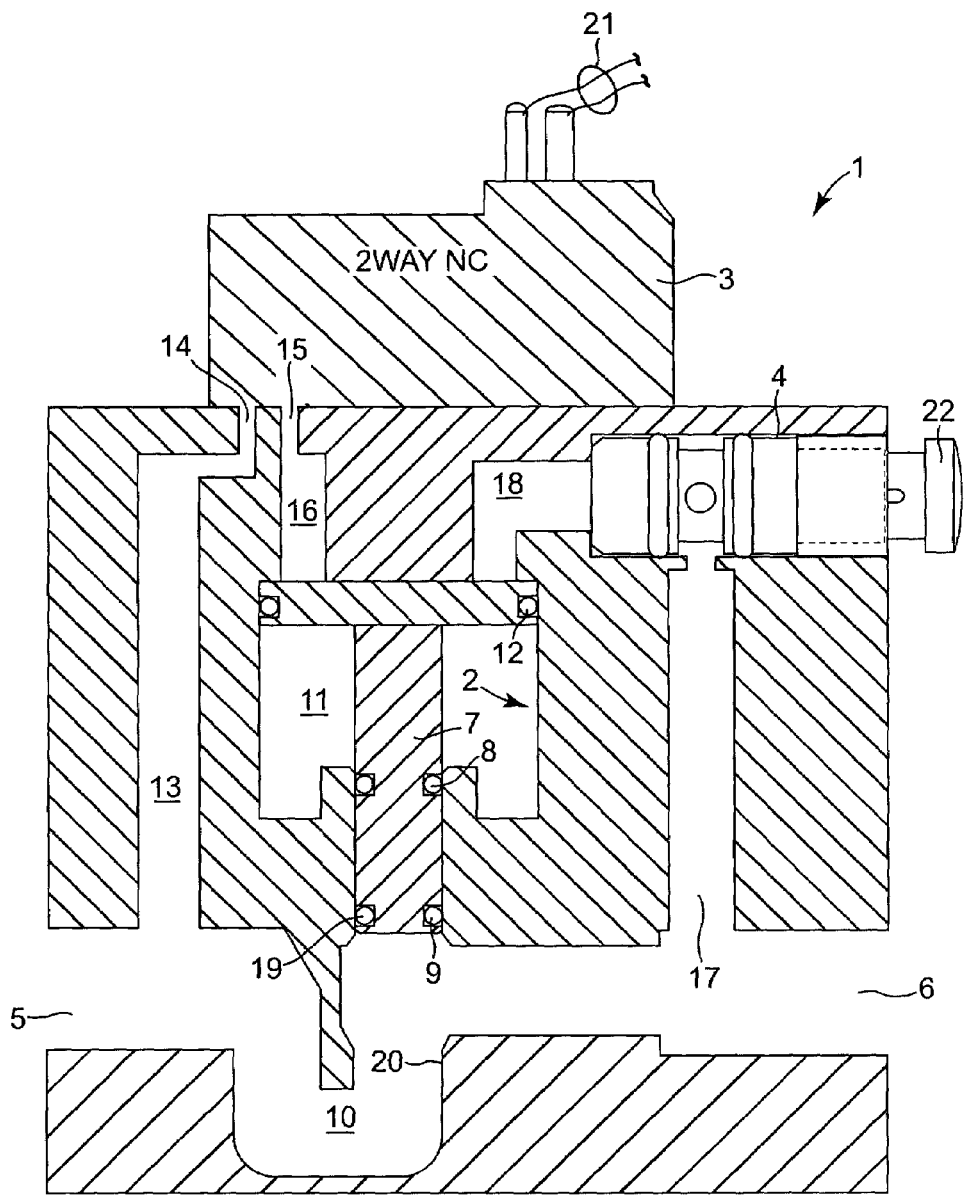
FIGS. 1 and 2 are schematic side cross-sectional views of one embodiment of the invention.
Figure 2:
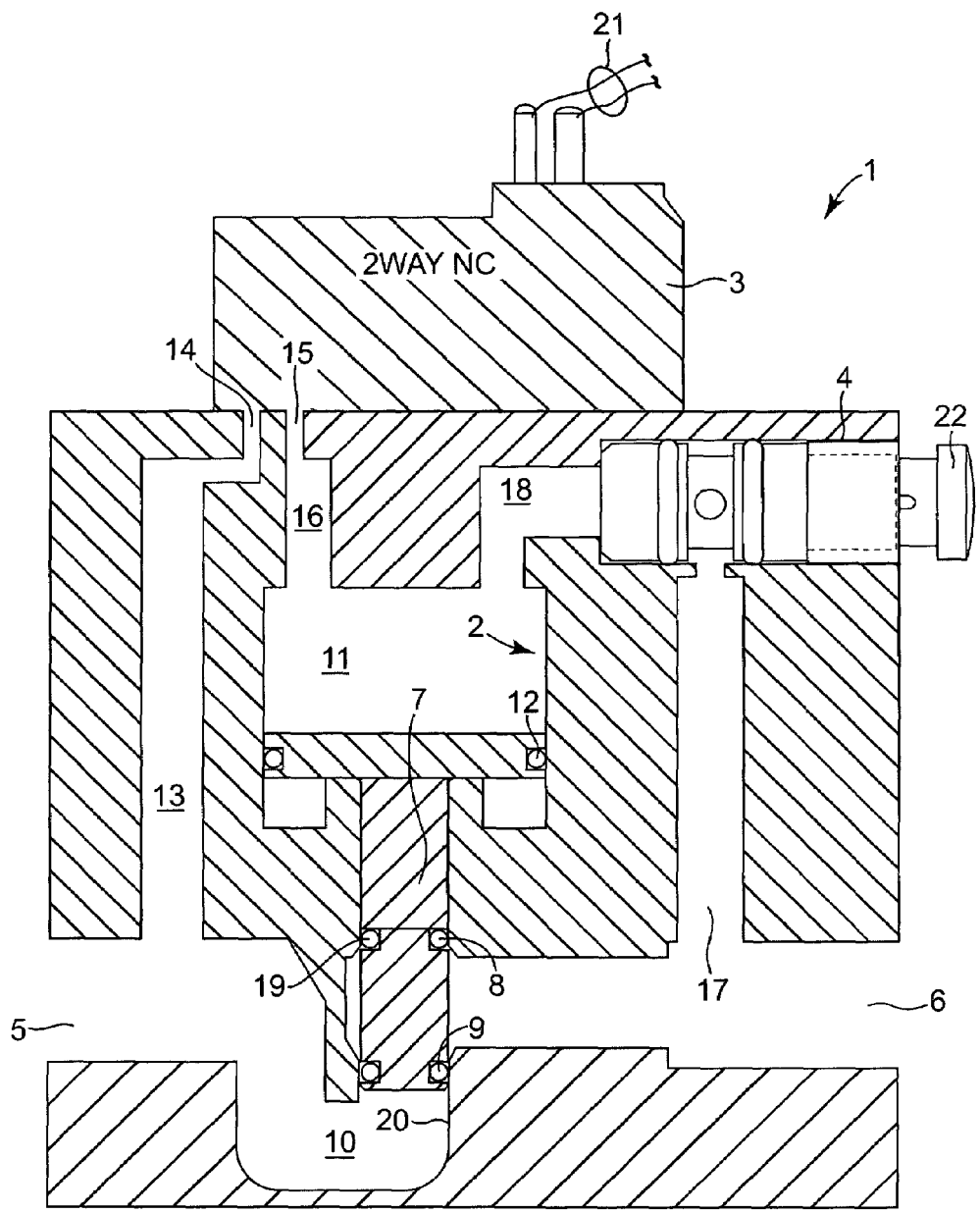

FIGS. 1 and 2 are schematic side cross sectional views of one embodiment of the invention, shown open in FIG. 1 and closed in FIG. 2. Valve assembly 1 comprises the combination of shutoff valve 2, normally closed two-position solenoid valve 3 and a two-position reset valve 4. Valve assembly 1 has an inlet 5 and outlet 6 connected to respective sides of shutoff valve 2. The piston 7 of shutoff valve 2 has two O-rings. Upper O-ring 8 prevents fluid from leaking from the main flow path 10 into the lower actuator chamber 23. Lower O-ring 9 shuts off flow by closing the main flow path 10 when valve 2 has been actuated, as shown in FIG. 2. The shaft of the piston thus acts as a plug, creating either the open or closed positions of the shutoff valve 1 depending on its raised or lowered positions, respectively. Whether the piston 7 is in the upward, or open, position as shown in FIG. 1 or the lower, or closed, as shown in FIG. 2, a third isolation O-ring 12 seals the upper actuator chamber 11 and lower actuator chamber 23 from each other. The lower actuator chamber 23 is vented to the atmosphere.

An inlet bypass 13 is connected between the inlet port 14 of solenoid valve 3 and the inlet 5. The outlet port 15 of solenoid valve 3 is connected to the upper portion of actuator chamber 11 by passage 16. Similarly, outlet 6 has an outlet bypass 17 that is connected to the upper half of actuator chamber 11 by passage 18, with reset valve 4 either blocking or allowing flow between bypass 17 and passage 18.

Shutoff valve 2 is designed with upper and lower valve seats 19 and 20 respectively, so that O-rings 8 and 9 can ensure a tight seal in either the upper (FIG. 1) or lower (FIG. 2) position of piston 7. Notably, shutoff valve 2 does not have a spring to drive piston 7 to "normally open" or "normally closed" positions in the usual sense. Instead, the pressure of the fluid passing through the bypass lines, solenoid valve, and reset valve, and the resultant pressure on the valve actuator relative to the pressure in the main flow through the shutoff valve, will determine the position of the shutoff valve.

The positions of the two valve seats are selected to keep the assembly clean of contaminant buildup in two ways. First, the upper valve seat 19 is recessed out of the primary fluid stream (inlet 5, main flow path 10, and outlet 6), thus avoiding contaminants in the first place. By contrast, the lower valve seat 20 is well within the primary fluid stream so that the velocity of the fluid flow across it sweeps the contaminants downstream, thus preventing buildup. Also, the lower O-ring 9 protects the smoothness of the bore in which piston 7 moves, so that the upper O-ring 8 may freely slide downward when the shutoff valve 2 is actuated. Even if there is any contaminant buildup tending to prevent movement of piston 7, the design of the shutoff valve 2 provides a force on top of piston 7 that is intended to be great enough to overcome any buildup that may be present. The amount of force required (i.e., power factor of the shutoff valve 2 that will be sufficient) will vary with design conditions, including the amount of sediment expected in the fluid. Thus, the valve assembly 1 is designed to ensure that piston 7 may fully extend so that O-ring 9 properly seals against lower valve seat 20 to shut off the flow of fluid through the main flow path 10, even if there has been contaminant buildup over time.

Solenoid valve 3 may be any conventional two-way, normally closed electric or electronically actuated solenoid valve. The internal construction of solenoid valve 3 is not critical to the scope of the invention, and therefore it is not shown in detail in FIGS. 1 and 2. As illustrated, it is attached outside, but directly to, the body of valve assembly 1 but this is a matter of convenience for manufacturing and assembly. Solenoid valve 3 is activated from its normally closed to its open position when it receives an electrical or electronic signal on a pair of electrical conductors 21, according to conventional principles. Loss of the electronic or electric signal will cause solenoid valve to close if it is open. As with the shutoff valve 2, when the shutoff valve 2 is open (i.e., the normal or "standby" condition in which fluid flows downstream), the fluid does not flow through the solenoid valve 3, and thus solenoid valve 3 is protected from a long-term buildup of contaminants.

Reset valve 4 may be any conventional two-position flow switch. As illustrated, it is a two-position inline switch manually activated by push button 22. However, it could be an electrically controlled valve, such as another solenoid valve, and thus optionally could also be remotely controlled such as by another electrical signal. As illustrated, it is incorporated directly inline with the flow through outlet bypass 17 and passage 18, but this is only a preference. In general, the switch does not need to be inline but must shut off flow between outlet 6 and actuator 11.

The shutoff valve further comprises a region of reduced pressure downstream of the actuator but prior to the outlet. This region of reduced pressure is connected to outlet bypass 17 to provide the bypass (through reset valve 4) to the springless actuator 11. If shutoff valve 2 has been closed, then when reset valve 4 is subsequently actuated, the lower pressure (relative vacuum) pulls fluid from above the piston 7 at the same time that main fluid pressure on the lower portion of the piston stem begins to open valve 2. This provides enough force to eliminate the need for a spring on the bottom of the piston, and it also increases the speed with which the valve will reset.

A fixture downstream of valve system 1 may be modeled as a two position flow switch, e.g., a faucet, toilet, washing machine, dishwasher, etc. When the position of the fixture downstream of valve system 1 is taken into account, the possible operating modes for the valve system 1 are shown in Table 1, below.

TABLE 1

| OPERATING MODES | | | |
| --- | --- | --- | --- |
| Shutoff Valve Condition | Downstream Fixture Condition | Action Applied | Shutoff Valve Action |
| Open | Open | Solenoid Valve Actuated | Closes |
| Open | Closed | Solenoid Valve Actuated | Closes |
| Open | Open | Reset Button Pushed | None |
| Open | Closed | Reset Button Pushed | Closes |
| Closed | Open | Solenoid Valve Actuated | None |
| Closed | Closed | Solenoid Valve Actuated | None |
| Closed | Open | Reset Button Pushed | Opens |
| Closed | Closed | Reset Button Pushed | None |

Thus, in summary, the solenoid valve always closes the valve; the reset button will open the shutoff valve if the downstream fixture is open, and close the shutoff valve if the downstream fixture is closed. Electrical current does not need to be on in a sustained mode to maintain the valve in operating position (either open or closed). Also, the valve system operates when "dry" as opposed to "wet" as in a typical diaphragm valve arrangement. Finally, the valve system provides two different modes of operation, depending on the condition of the setting valve, with only three basic components, thus eliminating the need for additional valves.

The scope of the invention is not limited to the particular embodiment illustrated in FIGS. 1 and 2, but that is the preferred embodiment for use on domestic water lines. It is preferred to have unitary or "single body" construction that may be assembled from subcomponents if desired, according to known principles. The inlet and outlet are threaded or otherwise fitted to be compatible with common domestic water plumbing.

Relevant parameters for this embodiment include: a fluid line size of between ¼ inch and 1 inch diameter; a flow rate up to 40 gallons per minute; and a pressure drop of approximately 5 pound/square inch (psi) at 70 gallons per minute. The preferred solenoid valve is a Pneumadyne brand two-way normally closed cartridge valve; one example used in prototypes of the invention was the Pneumadyne G328/2E 2/2 (0–10 bar) normally closed valve, but this is only an example and not a limitation on the scope of the invention.

In the context of this invention, "springless" means more than just literally "without a spring." In general, there is no element of the invention that is biased for or against motion of the piston in any direction that would tend to place the valve in a "normal" position (such as the commonly understood "normally open" and "normally closed" positions) in normal use. The pressures exerted by the fluid on the piston, and otherwise as described above, determine the position of the piston. Ambient forces external to the valve, such as gravity, are not considered as "elements of the valve" for purposes of defining this invention. That is not to say that valve designs that rely upon gravity to bias an element into a normally open or normally closed position do not exist, but rather that such valves are not "springless" for purposes of this invention because they could not perform their normal functions absent the externally applied force. Valves that rely upon resilience, flexibility, elasticity, or any similar property of materials to provide a biasing force are also not considered "springless," even if no spring per se is used in such valves.

The term "O-ring" refers not only to a O-shaped seal but also encompasses any waterproof seal accomplishing the same functions as those conventionally performed by an O-ring, and as described above.

I claim:

1. A combination for application onto a pressurized fluid line having upstream and downstream ends, comprising:
   a) a shutoff valve having an inlet for connection to the upstream end of the pressurized fluid line, an outlet for connection to the downstream end of the pressurized fluid line, and a springless actuator for driving a plug between open and closed positions of a main flow path connecting the upstream and downstream ends through the shutoff valve, and an upper chamber adjacent the springless actuator;
   b) a normally closed two-position solenoid valve controlling flow between the upper chamber and an inlet bypass channel connected to the inlet of the shutoff valve; and
   c) a fluid reset switch controlling flow between the upper chamber and a outlet bypass channel connected to the outlet of the shutoff valve;
in which a region of reduced pressure is located downstream of the springless actuator but upstream of the downstream end of the pressurized fluid line, the region of reduced pressure being connected to the outlet bypass channel side of the fluid reset switch.

2. The combination of claim 1, in which the position of the shutoff valve is determined by the pressure of the fluid passing through the inlet and outlet bypass lines, solenoid valve and reset valve, and the resultant pressure on the valve actuator relative to the pressure in the main flow path through the shutoff valve.

3. The combination of claim 1, in which the shutoff valve further comprises a lower actuator chamber and an upper O-ring on the piston to prevent fluid from leaking from the main flow path into the lower actuator chamber.

4. The combination of claim 1, in which the shutoff valve further comprises a lower O-ring that closes the main flow path when the valve has been actuated.

5. The combination of claim 1, in which the shutoff valve further comprises a piston having a shaft that serves as the plug.

6. The combination of claim 1, in which the shutoff valve further comprises an upper actuator chamber, a lower actuator chamber, and an isolation O-ring that seals the upper actuator chamber and lower actuator chamber from each other.

7. The combination of claim 1, further comprising an upper valve seat recessed out of the main flow path.

8. The combination of claim 1, further comprising a lower valve seat in the main flow path.

9. The combination of claim 1, in which fluid does not flow through the solenoid valve when the shutoff valve is open to flow of fluid through the main flow path.

10. The combination of claim 1, in which the fluid reset switch is a two-position push button inline switch.

11. The combination of claim 1, in which the fluid reset switch is an electrically controlled valve.

12. The combination of claim 1, in which the fluid reset switch is manually activated.

13. The combination of claim 1, in which the fluid reset switch is remotely controlled.

14. The combination of claim 1, in which the fluid reset switch is controlled by an electrical signal.

15. The combination of claim 1, further comprising a fixture downstream of the valve system.

16. The combination of claim 15, in which the fixture is a two position flow switch.

17. The combination of claim 16, in which the two-position flow switch is one of a faucet, toilet, washing machine, and dishwasher.

18. The combination of claim 1, in which the solenoid valve controls operation of the shutoff valve in response to a non-continuous electrical signal to the solenoid valve.

19. The combination of claim 1, as installed on a domestic water line.

20. The combination of claim 1, in which the combination has a unitary construction.

21. The combination of claim 1, in which at least one of the inlet and outlet are fitted to be compatible with domestic water plumbing.

22. The combination of claim 1, in which at least one of the upstream and downstream ends of the pressurized fluid line has a size between ¼ inch and 1 inch in diameter.

23. The combination of claim 1, in which the combination has a flow rate less than 40 gallons per minute.

24. The combination of claim 1, in which the combination has a pressure drop of approximately 5 pound/square inch (psi) at 70 gallons per minute of flow.

25. The combination of claim 1, in which the shutoff valve has a power ratio of in the range of approximately eleven to one to approximately twelve to one.

* * * * *